(12) United States Patent
Saito et al.

(10) Patent No.: US 8,178,243 B2
(45) Date of Patent: May 15, 2012

(54) NON-AQUEOUS ELECTROLYTE SECONDARY BATTERY AND METHOD OF MANUFACTURING THE SAME

(75) Inventors: Motoharu Saito, Moriguchi (JP);
Hideyuki Koga, Moriguchi (JP);
Katsutoshi Takeda, Moriguchi (JP);
Masahisa Fujimoto, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 663 days.

(21) Appl. No.: 12/161,747

(22) PCT Filed: Nov. 15, 2006

(86) PCT No.: PCT/JP2006/322714
§ 371 (c)(1),
(2), (4) Date: Mar. 25, 2009

(87) PCT Pub. No.: WO2007/083434
PCT Pub. Date: Jul. 26, 2007

(65) Prior Publication Data
US 2010/0248040 A1    Sep. 30, 2010

(30) Foreign Application Priority Data

Jan. 23, 2006 (JP) .................. 2006-013744
Sep. 13, 2006 (JP) .................. 2006-248071

(51) Int. Cl.
*H01M 4/13* (2010.01)
*H01M 6/16* (2006.01)

(52) U.S. Cl. .............. 429/231.95; 429/341; 29/623.5; 252/182.1

(58) Field of Classification Search ............. 429/341, 429/221, 223, 224, 231.95; 29/623.5; 252/182.1
See application file for complete search history.

(56) References Cited

U.S. PATENT DOCUMENTS

| | | | |
|---|---|---|---|
| 5,531,920 A * | 7/1996 | Mao et al. | 252/182.1 |
| 6,306,542 B1 | 10/2001 | Nakano et al. | |
| 7,695,868 B2 * | 4/2010 | Inoue et al. | 429/224 |
| 2002/0098146 A1 * | 7/2002 | Takada et al. | 423/594 |
| 2007/0218361 A1 * | 9/2007 | Inoue et al. | 429/223 |
| 2010/0104944 A1 * | 4/2010 | Saito et al. | 429/223 |
| 2010/0129715 A1 * | 5/2010 | Saito et al. | 429/224 |
| 2010/0173202 A1 * | 7/2010 | Saito et al. | 429/224 |

FOREIGN PATENT DOCUMENTS
JP    7-142057 A    6/1995
(Continued)

OTHER PUBLICATIONS

Akihisa Kajiyama et al.; "Synthesis and electrochemical properties of LixCo0.5Mn0.5O2", Solid State Ionics, vol. 149, pp. 39-45, 2000. Cited in the spec.

F. Tournadre et al.; "On the mechanism of the P2-Na0.70CoO2 O2-LiCoO2 exchange reaction-Part I: proposition of a model to describe the P2-O2 transition"; Journal of Solid State Chemistry, vol. 177, pp. 2790-2802, 2004. Cited in the spec.

(Continued)

*Primary Examiner* — Helene Klemanski
(74) *Attorney, Agent, or Firm* — Westerman, Hattori, Daniels & Adrian, LLP

(57) ABSTRACT

A method of producing a non-aqueous electrolyte secondary battery having a negative electrode, a non-aqueous electrolyte, and a positive electrode having a positive electrode active material comprising sodium oxide, characterized in that: the sodium oxide contains lithium; and the molar amount of the lithium is less than the molar amount of the sodium.

5 Claims, 5 Drawing Sheets

| FOREIGN PATENT DOCUMENTS | | |
|---|---|---|
| JP | 8-171900 A | 7/1996 |
| JP | 2000-040513 A | 2/2000 |
| JP | 2000-203844 A | 7/2000 |
| JP | 2001-328818 A | 11/2001 |
| JP | 2002-220231 A | 8/2002 |
| JP | 2002-313337 A | 10/2002 |

OTHER PUBLICATIONS

International Search Report of PCT/JP2006/322714, date of mailing Feb. 27, 2007.

Chinese Office Action dated Jul. 5, 2011, issued in corresponding Chinese Patent Application No. 201010217684.2.

* cited by examiner

NON-AQUEOUS ELECTROLYTE SECONDARY BATTERY AND METHOD OF MANUFACTURING THE SAME

TECHNICAL FIELD

The present invention relates to a non-aqueous electrolyte secondary battery comprising a negative electrode, a non-aqueous electrolyte, and a positive electrode having a positive electrode active material comprising sodium oxide, and a method of manufacturing the same.

BACKGROUND ART

Mobile information terminal devices such as mobile telephones, notebook computers, and PDAs have become smaller and lighter at a rapid pace in recent years. This has led to a demand for higher capacity batteries as the drive power source for the mobile information terminal devices. In particular, an increased volumetric capacity density has been desired. Because of their high energy density and high capacity, non-aqueous electrolyte secondary batteries, such as represented by lithium secondary batteries, are widely utilized as the driving power sources for such mobile information terminals.

A non-aqueous electrolyte secondary battery as described above generally employs a positive electrode containing a positive electrode active material made of a lithium-containing transition metal composite oxide, a negative electrode containing a negative electrode active material made of a carbon material capable of intercalating and deintercalating lithium, such as graphite, and a non-aqueous electrolyte in which an electrolyte made of a lithium salt, such as $LiBF_4$ and $LiPF_6$, is dissolved in an organic solvent such as ethylene carbonate and diethyl carbonate. In this kind of battery, the charge-discharge operations are performed by migration of lithium ions between the positive and negative electrodes.

In recent years, as the number of functions of mobile information terminals has increased, the power consumption of the devices has been increasing. Accordingly, demand has been escalating for non-aqueous electrolyte secondary batteries that achieve further higher energy density.

In order to achieve a higher energy non-aqueous electrolyte secondary battery, it is necessary to use not only a high energy density negative electrode active material but also a high energy density positive electrode active material. In view of such circumstance, lithium-containing layered compounds such as $LiCoO_2$, $LiNiO_2$, and $LiNi_{1/3}Co_{1/3}Mn_{1/6}O_2$ have been proposed. In addition, sodium oxide has also drawn attention because many types of layered compounds that are difficult to synthesize with the use of lithium oxide are easily synthesized with sodium oxide. In particular, $Na_{0.7}CoO_2$ and $NaCo_{1/2}Mn_{1/2}O_2$ can be used as a positive electrode active material of the non-aqueous electrolyte battery by ion-exchanging sodium for lithium. Therefore, much research has been conducted on ion-exchange methods using a synthesis technique and a chemical technique using such substances (see Patent Documents 1 and 2 and Non-patent Documents 1 and 2 mentioned below).

[Patent Document 1] Japanese Published Unexamined Patent Application No. 2002-220231
[Patent Document 2] Japanese Published Unexamined Patent Application No. 2001-328818
[Non-patent Document 1] Akihisa. Kajiyama et al., Solid State Ionics, 149 (2002), 39-45
[Non-patent document 2] F. Tournadre et al, J. Solid State Chem. 177 (2004), 2790-2802

DISCLOSURE OF THE INVENTION

Problems to be Solved by the Invention

Here, when more than half of the lithium is extracted from $LiCoO_2$ (when $x \geq 0.5$ in $Li_{1-x}CoO_2$) in the case of using $LiCoO_2$ as the positive electrode active material, the crystal structure degrades, and the reversibility deteriorates. Thus, with $LiCoO_2$, the discharge capacity density that can be used is about 160 mAh/g, so it is difficult to achieve a higher energy density. Likewise, $LiNiO_2$ and $LiNi_{1/3}Co_{1/3}Mn_{1/3}O_2$ also have the same problem.

Also, a layered lithium oxide obtained by chemically ion-exchanging sodium and lithium in a known sodium layered compound is unlikely to meet the expectation as a high energy density material since it shows a discharge capacity density of only about 130 mAh/g.

The details are as follows. The above-mentioned Patent Documents 1 and 2 as well as Non-patent Document 1 are authored by the same inventors. Non-patent Document 1 shows the sample used for the ion-exchange by the authors belongs to the space group R3-m (the space group obtained when sodium oxide in the P3 structure is ion-exchanged with lithium, which changes into the O3 structure), and it has a discharge capacity of about 130 mAh/g. Furthermore, the authors mention that there exist difference structures, P2 and P3, for sodium oxide, and it is difficult to ion-exchange the sodium of the sample, which has the P2 structure, for lithium. Here, since the theoretical capacity of $LiCo_{0.5}Mn_{0.5}O_2$ is about 280 mAh/g, the above-mentioned inventions achieve only 50% of the theoretical capacity. Thus, a problem with the conventional techniques is that the discharge capacity cannot be increased.

The present invention has been accomplished in view of such circumstances, and it is an object of the present invention to provide a non-aqueous electrolyte secondary battery that has a high discharge capacity and good cycle performance and in which structure is stable even when lithium is extracted to a high potential.

Means for Solving the Problems

In order to accomplish the foregoing and other objects, the present invention provides a non-aqueous electrolyte secondary battery comprising a negative electrode, a non-aqueous electrolyte comprising a carbonate-based solvent containing a lithium salt, and a positive electrode having a positive electrode active material comprising sodium oxide, characterized in that: the sodium oxide is represented by the general formula $Na_aLi_bM_xO_{2\pm\alpha}$, where $0.5 \leq a \leq 1.0$, $0 < b < 0.5$, $0.6 \leq a+b \leq 1.1$, $0.90 \leq x \leq 1.10$, and $0 \leq \alpha \leq 0.1$, and M is at least one element selected from the group consisting of manganese, iron, cobalt, and nickel; and the sodium oxide has a main peak at $2\theta=15.9°$ to $16.9°$ as determined by X-ray powder crystal diffraction (Cu$\alpha$).

In the previously-mentioned ion-exchange method using a chemical reagent, an exchange reaction takes place between the sodium ions and the lithium ions in the vicinity of the reagent so that almost all of the sodium ions are exchanged for lithium ions. Therefore, the crystal structure undergoes strain. On the other hand, in the above-described configuration in which the sodium oxide, which is the positive electrode active material, contains lithium and that the molar amount of lithium is less than the molar amount of the sodium, it is believed that the load on the crystal structure is reduced when the ion-exchange takes place between sodium and lithium after preparing the positive electrode active material, although the reason is not yet clear. The just-mentioned effect is significant especially because the amount of lithium is controlled to be less than the amount of sodium. As a result, it becomes possible to provide a non-aqueous electrolyte secondary battery that has a high discharge capacity and in which the structure is stable even when lithium is extracted to a high potential so that good cycle performance can be obtained.

Although the above-described positive electrode active material can be used by ion-exchange of sodium and lithium, it is believed that it can serve the role as the positive electrode active material even without the ion-exchange. Accordingly, the positive electrode active material that has not been subjected to the ion-exchange may be referred to as a pre-ion-exchange positive electrode active material, whereas the positive electrode active material that has been subjected to the later-described ion-exchange may be referred to as a post-ion-exchange positive electrode active material.

Such a non-aqueous electrolyte secondary battery shows little electrolyte decomposition even when it is charged to 5.0 V and exhibits good cycle performance. The reason is believed to be that the surface film produced by the reaction between sodium ions and the electrolyte solution and the like at the initial stage is more stable than the surface film produced by the reaction between lithium ions and the electrolyte solution and the like.

As the just-described sodium oxide, a preferable example of the composition include $Na_aLi_bMn_yCo_zO_{2\pm\alpha}$, where $0.5<a\leq1.0$, $0<b<0.5$, $0.6\leq a+b\leq1.1$, $0.45\leq y\leq0.55$, $0.45\leq z\leq0.55$, $0.90\leq y+z\leq1.10$, and $0\leq\alpha\leq0.1$.

The reason is that the use of the pre-ion-exchange positive electrode active material with the above-described configuration makes it possible to increase the charge-discharge capacity, and also it can withstand a high voltage since the structure is stable. Here, the reason why the amount of oxygen ($\alpha$ in the general formula $Na_aLi_bM_xO_{2\pm\alpha}$) is restricted to the range $0\leq\alpha\leq0.1$ is that the balance in electric charge and the situation in which lack or excess of oxygen occurs are taken into consideration. This also applies to the later-described positive electrode active material.

The additive elements that are contained in the lithium-containing sodium oxide are not limited to manganese, iron, cobalt, and nickel, but may include titanium, vanadium, chromium, copper, zinc, aluminum, zirconium, niobium, molybdenum, tantalum, tungsten, cerium, neodymium, and the like. A specific example include a compound represented by the general formula $Na_aLi_bM_xO_{2\pm\alpha}$ (where $0\leq\alpha\leq1.0$, $0<b<0.5$, $a>b$, $0.6\leq a+b\leq1.1$, $0.90\leq x\leq1.10$, and $0\leq\alpha\leq0.1$; and M is at least one element among titanium, vanadium, chromium, manganese, iron, cobalt, nickel, copper, zinc, aluminum, zirconium, niobium, molybdenum, tantalum, tungsten, cerium, and neodymium).

The present invention also provides a non-aqueous electrolyte secondary battery comprising a negative electrode, a non-aqueous electrolyte comprising a carbonate-based solvent containing a lithium salt, and a positive electrode having a positive electrode active material comprising sodium oxide, characterized in that: the sodium oxide contains lithium; the sodium oxide has a main peak at $2\theta=17.5°$ to $19.0°$ and sub-peaks at $35.5°$ to $37.5°$ and $66.0°$ to $67.5°$, as determined by X-ray powder crystal diffraction (Cuk$\alpha$) measured at the time when the battery is charged to 25% to 50% of the battery capacity after manufacture of the battery; and the sodium oxide is represented by the general formula $Na_aLi_bMn_yCo_zO_{2\pm\alpha}$, where $0<a\leq0.7$, $0<b<1.0$, $0.6\leq a+b\leq1.1$, $0.45\leq y\leq0.55$, $0.45\leq z\leq0.55$, $0.90\leq y+z\leq1.10$, and $0\leq\alpha\leq0.1$.

By subjecting the foregoing pre-ion-exchange positive electrode active material to the ion-exchange of sodium and lithium, the post-ion-exchange positive electrode active material is prepared. In this positive electrode active material, lithium as well as sodium are added to the pre-ion-exchange positive electrode active material. Therefore, the crystal structure is not destroyed even when it is charged to 5.0 V versus metallic lithium, and the capacity of the positive electrode can be increased remarkably.

It should be noted that the value of parameter b in the sodium oxide represented by the general formula $Na_aLi_bM_xO_{2\pm\alpha}$ includes both the value in a charged state and that in a discharged state.

It is more preferable that the sodium oxide be $Na_aLi_bMn_yCo_zO_{2\pm\alpha}$ (where $0.024\leq a\leq0.7$, $0.17<b<0.8$, $0.49\leq y\leq0.51$, $0.49\leq z\leq0.51$, $0.98\leq y+z\leq1.02$, and $0\leq\alpha\leq0.1$).

It is desirable that the potential of the positive electrode at end of charge be 4.5 V or higher versus metallic lithium.

The crystal structure of the positive electrode active material is not destroyed even when charged until the potential of the positive electrode reaches 4.5 V or higher versus metallic lithium. Therefore, the capacity of the positive electrode can be increased remarkably. Moreover, since this condition is kept even when the charge-discharge process is repeated, the cycle performance is also improved.

It is preferable that the negative electrode active material for the negative electrode comprise at least one substance selected from the group consisting of metallic lithium, silicon, carbon, tin, germanium, aluminum, lead, indium, gallium, a lithium-containing alloy, a lithium-intercalated carbon material, a lithium-intercalated silicon material, and a compound containing lithium and carbon.

An example of the just-mentioned compound containing lithium and carbon include intercalated graphite, in which lithium is intercalated between the layers of graphite.

Possible source materials of the lithium and sodium in the above-described lithium-containing sodium oxide include carbonate, hydrogen carbonate, oxalate, acetate, citrate, formate, nitrate, hydroxide, oxide, and peroxide of lithium and those of sodium.

In addition, it is preferable that part or all of the sodium of the above-described lithium-containing sodium oxide can undergo the ion-exchange in a carbonate solvent containing a lithium salt. It is inferred that the ion-exchange reaction is considerably rapid.

The present invention also provides a method of manufacturing a non-aqueous electrolyte secondary battery, comprising the steps of: preparing a positive electrode active material comprising a lithium-containing sodium oxide in which the molar amount of lithium is less than the molar amount of sodium by sintering a material containing at least a sodium compound and a lithium compound; immersing the positive electrode active material in a non-aqueous electrolyte comprising a carbonate-based solvent containing a lithium salt to ion-exchange the sodium oxide preparing a positive electrode active material slurry containing the positive electrode active material and a binder, and thereafter applying the positive electrode active material slurry to a positive electrode current collector, to prepare a positive electrode; interposing a separator between the negative electrode and the positive electrode to prepare a power-generating element; and enclosing the power generating element into a battery case, and filling an electrolyte solution into the battery case.

According to the above-described method, the ion-exchange of sodium and lithium is performed by merely immersing a pre-ion-exchange positive electrode active material in a non-aqueous electrolyte comprising a carbonate-based solvent containing a lithium salt. Therefore, it is possible to manufacture a non-aqueous electrolyte secondary battery provided with a post-ion-exchange positive electrode active material easily.

The present invention also provides a method of manufacturing a non-aqueous electrolyte secondary battery, comprising the steps of: preparing a positive electrode active material comprising a lithium-containing sodium oxide in which the molar amount of lithium is less than the molar amount of sodium by sintering a material containing at least a sodium compound and a lithium compound; preparing a positive electrode active material slurry containing the positive electrode active material and a binder, and thereafter applying the positive electrode active material slurry to a positive electrode current collector, to prepare a positive electrode; immersing the positive electrode in a non-aqueous electrolyte comprising a carbonate-based solvent containing a lithium salt to ion-exchange the sodium oxide interposing a separator between the negative electrode and the positive electrode to prepare a power-generating element; and enclosing the power generating element into a battery case, and filling an electrolyte solution into the battery case.

According to the above-described method, the ion-exchange of sodium and lithium is performed by merely immersing the positive electrode in a non-aqueous electrolyte comprising a carbonate-based solvent containing a lithium salt. Therefore, it is possible to manufacture a non-aqueous electrolyte secondary battery provided with a post-ion-exchange positive electrode active material more easily.

It is desirable that the non-aqueous electrolyte and the carbonate-based solvent containing a lithium salt have the same composition.

This makes it possible to avoid problems such as deterioration of the battery performance resulting from mixture of different electrolytes.

It is desirable that the lithium salt be $LiPF_6$, and the carbonate-based solvent be a mixed solvent containing ethylene carbonate and diethyl carbonate.

In such a method, the ion-exchange of sodium and lithium can be easily performed.

The present invention also provides a method of manufacturing a non-aqueous electrolyte secondary battery, comprising the steps of: preparing a positive electrode active material comprising a lithium-containing sodium oxide having a main peak at $2\theta=15.9°$ to $16.9°$ as determined by X-ray powder crystal diffraction (Cuk$\alpha$) and in which the molar amount of lithium is less than the molar amount of sodium, by sintering a material containing at least a sodium compound and a lithium compound; preparing a positive electrode active material slurry containing the positive electrode active material and a binder, and thereafter applying the positive electrode active material slurry to a positive electrode current collector, to prepare a positive electrode; interposing a separator between the negative electrode and the positive electrode to prepare a power-generating element; and enclosing the power generating element into a battery case, and filling a non-aqueous electrolyte comprising a carbonate-based solvent containing a lithium salt into the battery case to ion-exchange the sodium oxide.

According to the above-described method, the ion-exchange of sodium and lithium is performed by merely filling the non-aqueous electrolyte in the battery case. Therefore, it is possible to prevent an increase in the manufacture cost of the non-aqueous electrolyte secondary battery provided with a post-ion-exchange positive electrode active material.

(Miscellaneous)

(1) When using an active material that has high electrical conductivity, the positive electrode can function even when no conductive agent is added. However, when the positive electrode contains an active material with a low electrical conductivity, it is desirable to use a conductive agent. Any material having electrical conductivity may be used as the conductive agent. In particular, at least one substance among oxides, carbides, nitrides and carbon materials that have good conductivity may be used. Examples of the oxides include tin oxide and indium oxide. Examples of the carbides include tungsten carbide and zirconium carbide. Examples of the nitrides include titanium nitride and tantalum nitride. It should be noted that in the case that such a conductive agent is added, the conductivity in the positive electrode cannot be improved sufficiently if the amount added is too small; on the other hand, the relative proportion of the active material in the positive electrode becomes too small and the energy density lowers when the amount added is too large. For this reason, the amount of the conductive agent should be controlled in the range of from 0 mass % to 30 mass %, preferably from 0 mass % to 20 mass %, more preferably from 0 mass % to 10 mass %, with respect to the total amount of the positive electrode.

(2) Examples of the binder used for the positive electrode include polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose, and combinations thereof. When the amount of the binder agent added to the positive electrode is too large, the energy density of the positive electrode lowers because the relative proportion of the active material contained in the positive electrode becomes small. For this reason, the amount of binder should be in the range of from 0 mass % to 30 mass %, preferably from 0 mass % to 20 mass %, more preferably from 0 mass % to 10 mass %, with respect to the total amount of the positive electrode.

(3) Examples of the solvent of the non-aqueous electrolyte used in the present invention include cyclic carbonic esters, chain carbonic esters, esters, cyclic ethers, chain ethers, nitriles, and amides. Examples of the cyclic carbonic esters include ethylene carbonate, propylene carbonate and butylenes carbonate. It is also possible to use a cyclic carbonic ester in which part or all of the hydrogen groups of the just-mentioned cyclic carbonic esters is/are fluorinated. Examples of such include trifluoropropylene carbonate and fluoroethyl carbonate. Examples of the chain carbonic esters include dimethyl carbonate, ethyl methyl carbonate, diethyl carbonate, methyl propyl carbonate, ethyl propyl carbonate, and methyl isopropyl carbonate. It is also possible to use a chain carbonic ester in which part or all of the hydrogen groups of one of the foregoing chain carbonic esters is/are fluorinated. Examples of the esters include methyl acetate, ethyl acetate, propyl acetate, methyl propionate, ethyl propionate, and γ-butyrolactone. Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butylphenyl ether, pentylphenyl ether, methoxytoluene, benzyl ethyl ether, diphenyl ether, dibenzyl ether, o-dimethoxybenzene, 1,2-diethoxyethane, 1,2-dibutoxy ethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether. Examples of the nitriles include acetonitrile. Examples of the amides include dimethylformamide. These substances may be used either alone or in combination.

(4) The lithium salt to be added to the non-aqueous solvent may be any lithium salt that is commonly used in conventional non-aqueous electrolyte secondary batteries. It is possible to use, for example, at least one substance selected from $LiBF_4$, $LiPF_6$, $LiCF_3SO_3$, $LiC_4F_9SO_3$, $LiN(CF_3SO_2)_2$, $LiN(C_2F_5SO_2)_2$, $LiAsF_6$, and lithium difluoro(oxalate)borate.

(5) In the case that the ion-exchange of sodium and lithium is performed by immersing the positive electrode active material or the positive electrode containing the positive electrode active material in an electrolyte solution before assembling the battery (in the case of using the post-ion-exchange positive electrode active material), the solvent and the lithium salt therefor may be the same ones as exemplified in the foregoing (3) and (4) (i.e., the electrolyte solution used in the actual battery).

Advantages of the Invention

The present invention makes it available a non-aqueous electrolyte secondary battery that has a high discharge capacity and in which the structure is stable even when lithium is extracted to a high potential so that good cycle performance can be obtained.

BEST MODE FOR CARRYING OUT THE INVENTION

Hereinbelow, preferred embodiments of the non-aqueous electrolyte secondary battery according to the invention will be described with reference to FIG. 1. It should be construed, however, that the non-aqueous electrolyte secondary battery according to this invention is not limited to the following embodiments and examples but various changes and modifications are possible without departing from the scope of the invention.

[Preparation of Working Electrode]

First, sodium carbonate ($Na_2Co_3$), lithium carbonate ($Li_2Co_3$), manganese oxide ($Mn_2O_3$), and cobalt oxide ($Co_3O_4$) were prepared as the starting materials. The materials were mixed so that the molar ratio of sodium, lithium, manganese, and cobalt became 0.6:0.1:0.5:0.5. Next, the mixed powder was formed into pellets, then pre-sintered in the air at 700° C. for 10 hours, and thereafter sintered in the air at 800° C. for hours, whereby a pre-ion-exchange positive electrode active material (lithium-containing sodium oxide) was prepared.

Thereafter, 80 mass % of the just-described positive electrode active material, 10 mass % of acetylene black as a conductive agent, and 10 mass % of polyvinylidene fluoride as a binder agent were mixed together, and N-methyl-2-pyrrolidone was added to the mixture, whereby a slurry was prepared. Lastly, this slurry was applied onto a current collector, then vacuum dried and formed at 110° C., whereby a working electrode was obtained.

[Preparation of Counter Electrode and Reference Electrode]

Each of a counter electrode 2 and a reference electrode 4 was prepared by cutting a metallic lithium plate into a predetermined size and attaching a tab thereto.

[Preparation of Non-Aqueous Electrolyte]

Lithium hexafluorophosphate ($LiPF_6$) was dissolved at a concentration of 1 mole/L in a mixed electrolyte of 3:7 volume ratio of ethylene carbonate (EC) and diethyl carbonate (DEC), whereby a non-aqueous electrolyte solution was prepared.

[Preparation of Test Cell]

Under an inert atmosphere, the counter electrode 2, a separator 3, the working electrode 1, a separator 3, and the reference electrode 4 were disposed in a test cell container 5 made of a laminate film. Then, the above-described non-aqueous electrolyte was filled in the test cell container 5. Thus, a test cell shown in FIG. 1 was prepared. Portions of the leads 6 jut out from the test cell container 5.

It should be noted that, by filling the above-described non-aqueous electrolyte in the test cell container 5, ion-exchange of sodium and lithium of the pre-ion-exchange positive electrode active material takes place, whereby a post-ion-exchange positive electrode active material is prepared.

EMBODIMENTS

First Embodiment

Example 1

A cell that was prepared in the same manner as described in the Best Mode for Carrying Out the Invention above was used as a test cell of Example 1.

The cell prepared in this manner is hereinafter referred to as a present invention cell A1.

Examples 2 to 18

Respective test cells were prepared in the same manner as described in Example 1 above, except that, when preparing the working electrodes, the molar ratios of sodium, lithium, manganese, and cobalt were set to be the values as set forth in Tables 1 and 2. It should be noted that the amount of oxygen in the positive electrode active material was assumed to be 2 mol in each of the test cells. This also applies to all the examples and comparative examples shown in the following.

The cells fabricated in these manners are hereinafter referred to as present invention cells A2 to A18, respectively.

Comparative Example

A test cell was prepared in the same manner as in Example 1 above, except that, when preparing the working electrode, sodium carbonate, manganese oxide, and cobalt oxide were prepared as the starting materials, and the materials were mixed so that the molar ratio of sodium, manganese, and cobalt became 0.7:0.5:0.5 (specifically, Comparative Example is different from Examples 1 to 18 above in that no lithium carbonate was used).

The cell fabricated in this manner is hereinafter referred to as Comparative Cell Z.

(Experiment 1)

The present invention cells A1 to A18 and the comparative cell Z were charged and discharged under the following charge-discharge conditions to determine the discharge capacity density at an end-of-charge potential of 4.5 V (vs. Li/Li$^+$), the discharge capacity density at an end-of-charge potential of 5.0 V (vs. Li/Li$^+$), and the average potential for each cell. The results are shown in Tables 1 and 2. In Tables 1 and 2, the discharge capacity density was obtained by dividing the current passed to the cell by the mass of the positive electrode active material, and the average potential was the result obtained in the charge-discharge range 2.5 V to 5.0 V (vs. Li/Li$^+$).

[1st to 3rd Cycles]

Charge Conditions

The cells were charged at a constant current of 0.125 mA/cm$^2$ (equivalent to 0.2 It) to an end-of-charge potential of 4.5 V (vs. Li/Li$^+$).

Discharge Conditions

The cells were discharged at a constant current of 0.125 mA/cm$^2$ (equivalent to about 0.2 It) to an end-of-discharge potential of 2.5 V (vs. Li/Li$^+$).

[4th to 6th Cycles]
Charge Conditions
The cells were charged to an end-of-charge potential of 5.0 V (vs. Li/Li$^+$) at the same charge current as in the 1st to 3rd cycles.
Discharge Conditions
The cells were discharged under the same conditions as in the 1st to 3rd cycles.

material) in which the sodium oxide contains lithium and the amount of the lithium is controlled to be less than the amount of the sodium.

In addition, where the composition ratio of the positive electrode active material (pre-ion-exchange positive electrode active material) is represented as Na:Li:Mn:Co=a:b:y:z, it is preferable that $0.5 \leq a \leq 1.0$, $0 < b \leq 0.5$, $a > b$, $0.6 \leq a+b \leq 1.1$, $0.90 \leq y \leq 1.10$, and $0 \leq z \leq 1.0$ (the present invention

TABLE 1

| Cell | Composition of positive electrode active material (mol) | Discharge capacity density at end-of-charge potential of 4.5 V (vs. Li/Li$^+$) (mAh/g) | Discharge capacity density at end-of-charge potential of 5.0 V (vs. Li/Li+) (mAh/g) | Average potential (V) (vs. Li/Li+) |
|---|---|---|---|---|
| A1 | Na:Li:Mn:Co = 0.6:0.1:0.5:0.5 | 123 | 183 | 3.8 |
| A2 | Na:Li:Mn:Co = 0.6:0.1:0.9:0.1 | 136 | 177 | 3.4 |
| A3 | Na:Li:Mn:Co = 0.6:0.2:0.9:0.1 | 130 | 178 | 3.4 |
| A4 | Na:Li:Mn:Co = 0.6:0.3:0.9:0.1 | 131 | 186 | 3.4 |
| A5 | Na:Li:Mn:Co = 0.6:0.4:0.9:0.1 | 124 | 189 | 3.4 |
| A6 | Na:Li:Mn:Co = 0.7:0.1:0.5:0.5 | 156 | 210 | 3.7 |
| A7 | Na:Li:Mn:Co = 0.7:0.2:0.5:0.5 | 157 | 215 | 3.7 |
| A8 | Na:Li:Mn:Co = 0.7:0.2:0.9:0.1 | 140 | 191 | 3.4 |
| A9 | Na:Li:Mn:Co = 0.7:0.3:0.5:0.5 | 134 | 189 | 3.7 |
| A10 | Na:Li:Mn:Co = 0.7:0.3:0.9:0.1 | 136 | 185 | 3.4 |

TABLE 2

| Cell | Composition of positive electrode active material (mol) | Discharge capacity density at end-of-charge potential of 4.5 V (vs. Li/Li$^+$) (mAh/g) | Discharge capacity density at end-of-charge potential of 5.0 V (vs. Li/Li+) (mAh/g) | Average potential (V) (vs. Li/Li+) |
|---|---|---|---|---|
| A11 | Na:Li:Mn:Co = 0.7:0.3:0.925:0.075 | 124 | 180 | 3.4 |
| A12 | Na:Li:Mn:Co = 0.7:0.3:0.95:0.05 | 135 | 195 | 3.4 |
| A13 | Na:Li:Mn:Co = 0.8:0.1:0.5:0.5 | 125 | 177 | 3.7 |
| A14 | Na:Li:Mn:Co = 0.8:0.1:0.9:0.1 | 116 | 165 | 3.5 |
| A15 | Na:Li:Mn:Co = 0.8:0.2:0.5:0.5 | 122 | 176 | 3.7 |
| A16 | Na:Li:Mn:Co = 0.8:0.2:0.9:0.1 | 138 | 180 | 3.4 |
| A17 | Na:Li:Mn:Co = 0.9:0.1:0.5:0.5 | 136 | 191 | 3.7 |
| A18 | Na:Li:Mn:Co = 0.9:0.1:0.9:0.1 | 123 | 166 | 3.4 |
| Z | Na:Mn:Co = 0.7:0.5:0.5 | 118 | 158 | 3.8 |

As clearly seen from Tables 1 and 2, the present invention cells A1 to A18 exhibit higher discharge capacity densities than the comparative cell Z. Although the present invention cell A14 shows a lower discharge capacity density at an end-of-charge potential 4.5 V than the comparative cell Z, it exhibits a higher discharge capacity density at an end-of-charge potential 5.0 V (a more desirable potential for the battery) than the comparative cell Z. From these results, it will be understood that it is preferable to use the positive electrode active material (pre-ion-exchange positive electrode active material) in which the sodium oxide contains lithium and the amount of the lithium is controlled to be less than the amount of the sodium.

cells A1 to A18). It is more preferable that $0.6 \leq a \leq 0.8$, $0 < b \leq 0.4$, $a > b$, $0.8 \leq a+b \leq 1.1$, $0.90 \leq y \leq 1.10$, and $0 \leq z \leq 1.0$ (e.g., the present invention cell A3). The most preferable ranges are: $0.65 \leq a \leq 0.75$, $0 < b \leq 0.3$, $a > b$, $0.8 \leq a+b \leq 1.0$, $0.90 < y < 1.10$, and $0 < z \leq 0.5$ (e.g., the present invention cell A6).

(Experiment 2)

In the present experiment 2, composition changes in the positive electrode active material were studied, and XRD measurement tests were carried out for the cases in which the composition changes occurred.

[A] Composition Change in the Positive Electrode Active Material

The composition changes of the positive electrode active material by initial charge and the composition changes of the positive electrode active material by immersion in the electrolyte solution were studied. The results are shown in Tables 3 and 4 below. In Table 3, the operations (1) to (5) were carried out in that order.

The composition analysis was conducted using flame photometry. The positive electrode active material used was the positive electrode active material used for the present invention cell A7 [that in which the molar ratio of sodium, lithium, manganese, and cobalt was 0.7:0.2:0.5:0.5 when sodium carbonate, lithium carbonate, manganese oxide, and cobalt oxide were mixed]. It should be noted that the positive electrode active material was subjected to a water wash treatment after the synthesis for the purpose of removing impurities.

Experiment Conditions

Electrolyte solution:electrolyte solution in which $LiPF_6$ was dissolved at a concentration of 1 mole/L in a 3:7 volume ratio of mixed electrolyte of EC and DEC.

Counter electrode (negative electrode):Metallic lithium was used.

Charge current during initial charge: 1/20 It mixed together) was controlled to be sodium:lithium=0.7:0.2 (molar ratio) when preparing the raw electrode, as described above. However, it was observed that after the sintering, the ratio of lithium was 0.196, almost the same as that of the preparation composition, but the ratio of sodium was 0.614, less than that of the preparation composition, as clearly seen from Table 3.

In addition, the composition of cobalt and manganese was a composition ratio of about 1:1, the same as the preparation, which was the same throughout the following (2) to (7).

b. Electrode Obtained by Immersing the Raw Electrode in an Electrolyte Solution for 24 Hours, Denoted as Sample (6) in Table 4

In this kind of electrode, the composition ratio of sodium and lithium was greatly different from that of the just-described Sample (1). However, the total amount of sodium and lithium was about 0.8, almost the same in both Sample (1) and Sample (6). Accordingly, it will be understood that by immersing the raw electrode in an electrolyte solution containing lithium ions at about 1 M, the sodium in the raw electrode is ion-exchanged for lithium.

TABLE 3

| Sample Cell | Molar ratio of Na | Molar ratio of Li | Molar ratio of Co | Molar ratio of Mn |
|---|---|---|---|---|
| Sample (1): Electrode immediately after preparation (raw electrode) | 0.614 | 0.196 | 0.497 | 0.503 |
| Sample (2): Electrode charged to 25% of the cell capacity | 0.047 | 0.611 | 0.498 | 0.502 |
| Sample (3): Electrode charged to 50% of the cell capacity | 0.060 | 0.434 | 0.498 | 0.502 |
| Sample (4): Electrode charged to 75% of the cell capacity | 0.042 | 0.285 | 0.498 | 0.502 |
| Sample (5): Electrode charged to 100% of the cell capacity | 0.024 | 0.175 | 0.500 | 0.500 |

TABLE 4

| Sample Cell | Molar ratio of Na | Molar ratio of Li | Molar ratio of Co | Molar ratio of Mn |
|---|---|---|---|---|
| Sample (6): Electrode obtained by immersing the raw electrode in electrolyte solution for 24 hours (electrolyte-impregnated electrode) | 0.313 | 0.537 | 0.490 | 0.510 |
| Sample (7): Electrode obtained by setting the raw electrode aside for 24 hours in an assembled battery (in-battery electrode) | 0.085 | 0.758 | 0.491 | 0.509 |

Results of the Experiment a. Electrode Immediately after Preparation, Denoted as Sample (1) in Table 3 (Hereinafter Also Referred to as a "Raw Electrode")

The preparation composition ratio (the composition ratio at the time when sodium carbonate, lithium carbonate, etc. are c. Electrodes Charged to 25%, 50%, 75%, and 100% of the Cell Capacity, Denoted as Samples (2) to (5), Respectively, in Table 3 (Hereinafter Also Referred to as "Charge Electrodes")

In such electrodes, the amount of sodium was almost the same. However, it was observed that the amount of lithium decreased as the charge depth increased. Thus, it will be appreciated that the cells are charged smoothly.

a. The Raw Electrode Set Aside for 24 Hours in an Assembled Battery (Cell), Denoted as Sample (7) in Table 4 (Hereinafter Also Referred to as a "In-Battery Electrode")

In such an electrode, the total amount of sodium and lithium was about 0.8, as in the case of the foregoing Sample (6). However, it was observed that the amount of sodium reduced while the amount of lithium increased in comparison with Sample (6). This was because the metallic lithium used for the negative electrode dissolved away and the sodium ions in the electrolyte solution were precipitated, so that the concentration of lithium ions in the electrolyte solution was maintained and the ion-exchange of sodium and lithium was sustained.

(Summary)

Although the process of ion-exchanging sodium for lithium using an electrolyte solution in which a lithium salt is dissolved may proceed at a temperature higher than room temperature, it also proceeds even at room temperature (about 25° C.) as described above, and it is expected that the rate of this ion-exchange reaction is considerably rapid. Therefore, the above-described method makes it possible to fabricate the positive electrode active material safely and economically. In addition, according to the above-described method, it is possible to perform the ion-exchange of sodium and lithium using various oxides containing sodium.

When various sodium-containing oxides are used as the positive electrode material of a lithium-ion battery, it is of course possible to use such oxides as the positive electrode active material after the sodium is ion-exchanged for lithium.

Moreover, as described above, the ion-exchange can be performed also in the in-battery electrode. This means that, since it is possible to perform the ion-exchange of sodium and lithium by merely filling an electrolyte solution containing a lithium salt into the battery, the productivity of the battery is prevented from decreasing.

[XRD Measurement Test]

An XRD measurement was conducted for the positive electrode active material used for the present invention cell A7 and Samples (1) to (5) in the foregoing [A] (the radiation source used was CuKα, and the measurement range was 2θ=10° to 80°). The results are shown in FIG. 2. Each of the samples was placed in a polyethylene bag, and argon was enclosed when the measurement was conducted. It has been known in advance that polyethylene shows broad peaks at 2θ=21 to 23°. In the XRD profile for the electrode charged to 50% of the cell capacity [(3) in FIG. 2], the peak intensity at 16° is relatively high, but it is believed that this was due to an experiment error.

For Samples (1), (6), and (7), the XRD measurements were carried out in the form of electrode plate, so the peaks originating from the materials other than the positive electrode active material (such as binder and conductive agent) appeared. For this reason, in order to determine the characteristic peaks of the present invention, the XRD data are shown in FIG. 3 and FIG. 4 (in which the intensities shown in FIG. 3 are enlarged in the range 2θ=30° to 80°) for (8) positive electrode active material powder obtained by immersing the pre-ion-exchanged positive electrode active material powder in the electrolyte solution for 24 hours to effect the ion exchange, and (9) positive electrode active material powder obtained by subjecting the pre-ion-exchange positive electrode active material powder to the ion exchange using the fused salt method described below. The XRD data for (9) as well as the XRD data for (8) are shown in order to make the peaks for (8) clearer because the peaks of the XRD data for (8) are not clear, as will be apparent from FIGS. 3 and 4.

The Fused Salt Method

Lithium nitrate and lithium chloride are mixed in advance in a molar ratio of 88:12. Then, 10 g of the mixture and 3 g of $Na_{0.7}Li_{0.2}Mn_{0.5}Co_{0.5}O_2$ are blended, and these are mixed in a mortar, and then kept at a furnace temperature of 290° C. in the atmosphere for 10 hours (Note that the relative amount of the mixture to sodium oxide [$Na_{0.7}Li_{0.2}Mn_{0.5}Co_{0.5}O_2$ in the foregoing case] is not limited to the just-mentioned amount, but it is possible that the mixture may be added by 5 times to 10 times mole to the sodium oxide). Next, the sample is taken out of the furnace, then water washed, filtered, and vacuum dried. Thereafter, an XRD measurement is carried out.

Results of the Experiment

Sample (1) showed the main peak at 2θ=15.9° to 16.9°. In Samples (2) and (3), in which the ion-exchange of sodium and lithium was performed, this peak decreased and the main peak newly appeared at 2θ=17.5° to 18.5°. In addition, diffraction peaks were also observed at 2θ=35.5° to 37.5°, 38.0° to 40.0°, 44.0° to 46.0°, 48.0° to 49.0°, 55.0° to 57.0°, 66.0° to 67.5°, 69.0° to 70.5°, and 77.0° to 78.0° (what are characteristic in the present invention are the peaks at 2θ=35.5° to 37.5° and 66.0° to 67.5°). Judging from the results, it can be determined that the samples that were subjected to the ion-exchange did not have the structure belonging to the space group R3-m, unlike the conventional products.

It should be noted that the above-described peaks are observed also in Sample (8) and (9). Therefore, it is understood that the peaks are unique to the positive electrode active materials used for the present invention and not the peaks originating from such materials as the binders and the conductive agents.

Second Embodiment

Example 1

A test cell was prepared in the same manner as in Example 1 of the first embodiment above, except that, when preparing the working electrode, sodium carbonate, lithium carbonate, and cobalt oxide were prepared as the starting materials, and that the materials were mixed so that the molar ratio of sodium, lithium, and cobalt became 0.6:0.4:1.0 (specifically, the present example is different from the examples in the first embodiment in that no manganese oxide was used).

The cell fabricated in this manner is hereinafter referred to as a present invention cell B1.

Example 2

A test cell was prepared in the same manner as in Example 1 of the first embodiment above, except that, when preparing the working electrode, sodium carbonate, lithium carbonate, and manganese oxide were prepared as the starting materials and the materials were mixed so that the molar ratio of sodium, manganese, and cobalt became 0.7:0.3:1.0 (specifically, the present example is different from Examples 1 to 18 above in that no cobalt oxide was used).

The cell fabricated in this manner is hereinafter referred to as a present invention cell B2.

Comparative Example 1

A test cell was prepared in the same manner as in Example 1 above, except that, when preparing the working electrode, sodium carbonate and cobalt oxide were prepared as the starting materials, and the materials were mixed so that the molar ratio of sodium and cobalt became 1.0:1.0 (specifically, the present example is different from Example 1 above in that no lithium carbonate was used).

The cell fabricated in this manner is hereinafter referred to as a comparative cell Y1.

Comparative Example 2

A test cell was prepared in the same manner as in Example 2 above, except that, when preparing the working electrode, sodium carbonate and manganese oxide were prepared as the starting materials, and the materials were mixed so that the molar ratio of sodium and manganese became 1.0:1.0 (specifically, the present example is different from Example 2 above in that no lithium carbonate was used).

The cell fabricated in this manner is hereinafter referred to as a comparative cell Y2.

(Experiment)

The present invention cells B1 and B2 as well as the comparative cells Y1 and Y2 were charged and discharged under the same charge-discharge conditions as in the first embodiment described above to determine the discharge capacity density at an end-of-charge potential of 4.5 V (vs. Li/Li$^+$), the discharge capacity density at an end-of-charge potential of 5.0 V (vs. Li/Li$^+$), and the average potential for each cell. The results are shown in Table 5. In Table 5, the discharge capacity density was obtained by dividing the current passed to the cell by the mass of the positive electrode active material, and the average potential was the result obtained in the charge-discharge range 2.5 V to 5.0 V (vs. Li/Li$^+$).

which the sodium oxide contains lithium and the amount of the lithium is controlled to be less than the amount of the sodium.

Third Embodiment

Example 1

A test cell was prepared in the same manner as in Example 1 of the first embodiment above, except that when preparing the working electrode, sodium carbonate, lithium carbonate, manganese oxide, cobalt oxide, and nickel hydroxide [Ni(OH)$_2$] were prepared as the starting materials, and that the materials were mixed so that the molar ratio of sodium, lithium, manganese, cobalt, and nickel became 0.5:0.5:0.5:0.25:0.25 (specifically, the present example is different from the examples in the first embodiment above in that nickel hydroxide was added).

The cell prepared in this manner is hereinafter referred to a present invention cell C1.

Examples 2 and 3

Respective test cells were prepared in the same manner as described in Example 1 above except that, when preparing the positive electrode active material, the molar ratios of sodium, lithium, manganese, cobalt, and nickel were set to be the values as set forth in Table 6.

The cells fabricated in these manners are hereinafter referred to as present invention cells C2 and C3, respectively.

(Experiment)

The present invention cells C1 to C3 were charged and discharged under the same charge-discharge conditions as in the first embodiment described above to determine the discharge capacity density at an end-of-charge potential of 4.5 V (vs. Li/Li$^+$), the discharge capacity density at an end-of-charge potential of 5.0 V (vs. Li/Li$^+$), and the average potential for each cell. The results are shown in Table 6. In Table 6, the discharge capacity density was obtained by dividing the

TABLE 5

| Cell | Composition of positive electrode active material (mol) | Discharge capacity density at end-of-charge potential of 4.5 V (vs. Li/Li$^+$) (mAh/g) | Discharge capacity density at end-of-charge potential of 5.0 V (vs. Li/Li+) (mAh/g) | Average potential (V) (vs. Li/Li+) |
|---|---|---|---|---|
| B1 | Na:Li:Co = 0.6:0.4:1.0 | 130 | 160 | 3.8 |
| B2 | Na:Li:Mn = 0.7:0.3:1.0 | 143 | 195 | 3.4 |
| Y1 | Na:Co = 1.0:1.0 | 120 | 134 | 3.7 |
| Y2 | Na:Mn = 1.0:1.0 | 78 | 82 | 3.2 |

As clearly seen from Table 5, the present invention cells B1 and B2 exhibit higher discharge capacity densities than the comparative cells Y1 and Y2. Thus, it will be understood that it is preferable to use the positive electrode active material in current passed to the cell by the mass of the positive electrode active material, and the average potential was the result obtained in the charge-discharge range 2.5 V to 5.0 V (vs. Li/Li$^+$).

TABLE 6

| Cell | Composition of positive electrode active material (mol) | Discharge capacity density at end-of-charge potential of 4.5 V (vs. Li/Li$^+$) (mAh/g) | Discharge capacity density at end-of-charge potential of 5.0 V (vs. Li/Li+) (mAh/g) | Average potential (V) (vs. Li/Li+) |
|---|---|---|---|---|
| C1 | Na:Li:Mn:Co:Ni = 0.5:0.5:0.5:0.25:0.25 | 125 | 168 | 3.7 |
| C2 | Na:Li:Mn:Co:Ni = 0.6:0.4:0.5:0.25:0.25 | 136 | 171 | 3.7 |
| C3 | Na:Li:Mn:Co:Ni = 0.7:0.3:0.5:0.25:0.25 | 151 | 191 | 3.8 |

As clearly seen from Table 6, the present invention cell C1 to C3 exhibit high discharge capacity densities. Thus, it will be understood that it is preferable to use the positive electrode active material in which the sodium oxide contains lithium and the amount of the lithium is controlled to be less than the amount of the sodium.

Fourth Embodiment

Example

The present invention cell A7 shown in the first embodiment was used as the present example.

Comparative Example

A test cell was fabricated in the same manner as described in the just-described Example, except that the positive electrode active material used was LiCoO$_2$ (an oxide belonging to the R3-m space group).

The cell fabricated in this manner is hereinafter referred to as Comparative Cell X.

(Experiment)

The cycle performance (capacity retention ratio) was studied for the present invention cell A7 and the comparative cell X. The results are shown in Table 7 below. The charge-discharge conditions were as follows. Each of the cells was charged to a current of 0.125 mA/cm$^2$ (equivalent to 0.2 It) to a charge potential of 5.0 V (vs. Li/Li$^+$) and thereafter discharged at a current of 0.125 mA/cm$^2$ (equivalent to about 0.2 It) to a discharge potential of 2.5 V (vs. Li/Li$^+$). In FIG. 5, the graph of the charge-discharge characteristics of the present invention cell A7 is shown.

TABLE 7

| Cell | Initial capacity (mAh/g) | Capacity (mAh/g) After 3 cycles | Capacity (mAh/g) After 5 cycles | Capacity retention ratio (%) After 3 cycles | Capacity retention ratio (%) After 5 cycles |
|---|---|---|---|---|---|
| A7 | 215 | 204 | 203 | 95 | 94 |
| X | 240 | 216 | 196 | 90 | 82 |

As clearly seen from Table 7 and FIG. 5, it is observed that the present invention cell A7 exhibits stable discharge characteristics, and moreover, it has a high capacity retention ratio in the cycle performance test. In contrast, it is observed that the comparative cell X has a low capacity retention ratio in the cycle performance test. Therefore, it is understood that it is preferable to use the above-described positive electrode active material.

Although it is not shown in Table 7, it was observed that the cycle performance further improved when the cell was charged several times at a charge potential of equal to or lower than 4.5 V (vs. Li/L$^+$) and thereafter charged to 5.0 V (vs. Li/L$^+$) [(2.5V to 5.0 V) the capacity retention ratio at the 3rd cycle: 98%].

A feature of this material is that the initial charge capacity densities are 80 mAh/g and 170 mAh/g and the discharge capacity densities are 157 mAh/g (initial charge-discharge efficiency: 196%) and 215 mAh/g (initial charge-discharge efficiency: 126%) at a charge potential of 4.5 V (vs. Li/L$^+$) and 5.0 V (vs. Li/L$^+$), respectively.

In addition, when this material is started from discharge, it shows an initial discharge capacity density of 69 mAh/g at a discharge potential of 2.5 V(vs. Li/L$^+$).

INDUSTRIAL APPLICABILITY

The present invention is applicable to, for example, driving power sources for mobile information terminals such as mobile telephones, notebook computers, and PDAs.

BRIEF DESCRIPTION OF THE DRAWINGS

FIG. 4 is a graph in which FIG. 2 is partially enlarged.

[DESCRIPTION OF REFERENCE NUMERALS]

Figure 1:
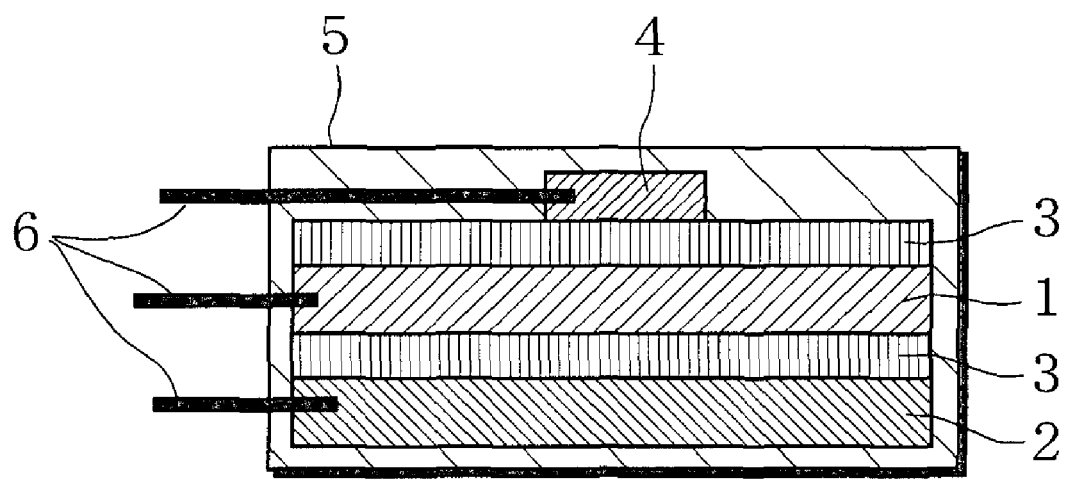
FIG. 1 is a cross-sectional view of a test cell used for the embodiments of the present invention.
Figure 2:
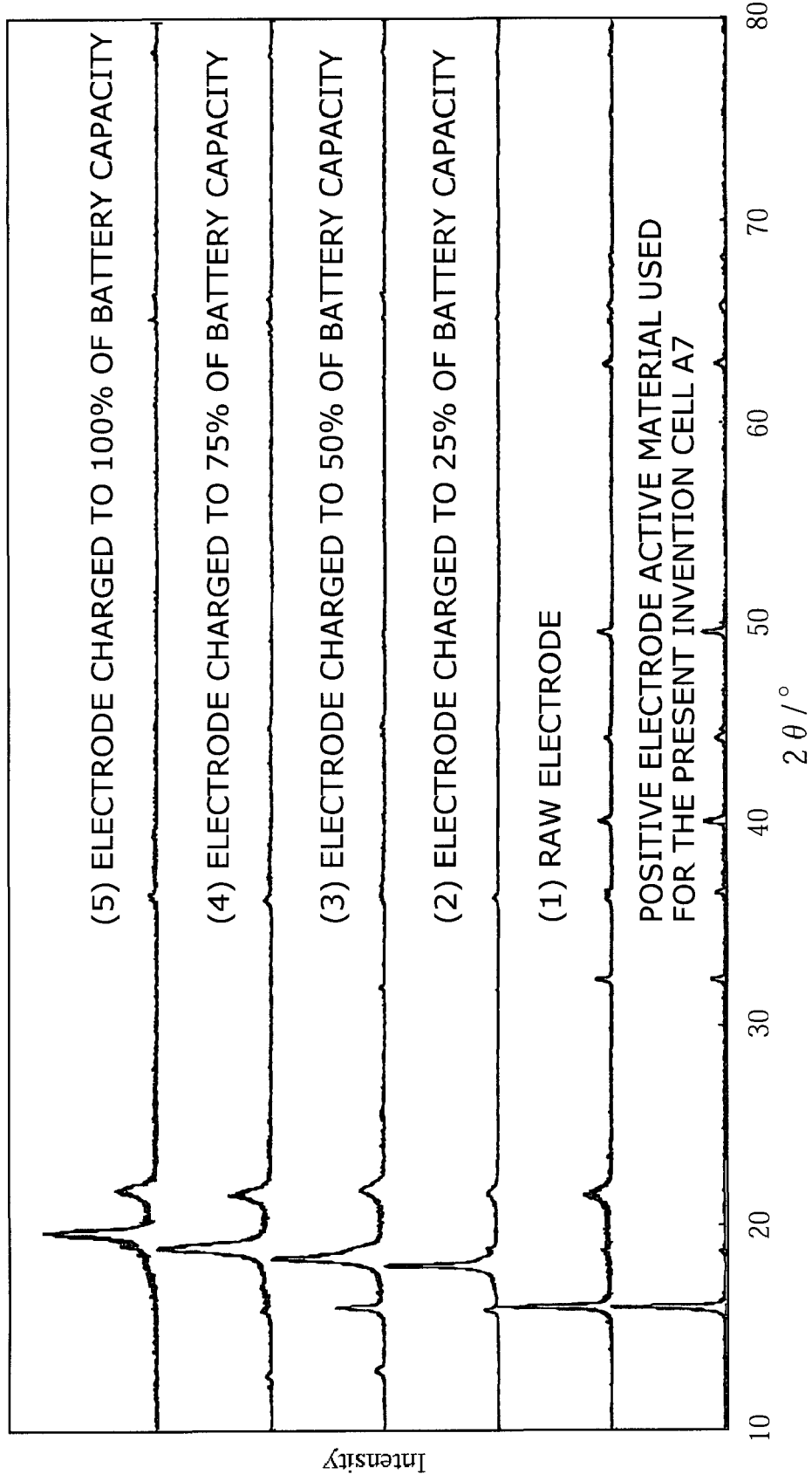
FIG. 2 is a graph showing XRD measurement results for the positive electrode active material used for the present invention cell A7 at various charge depths.
Figure 3:
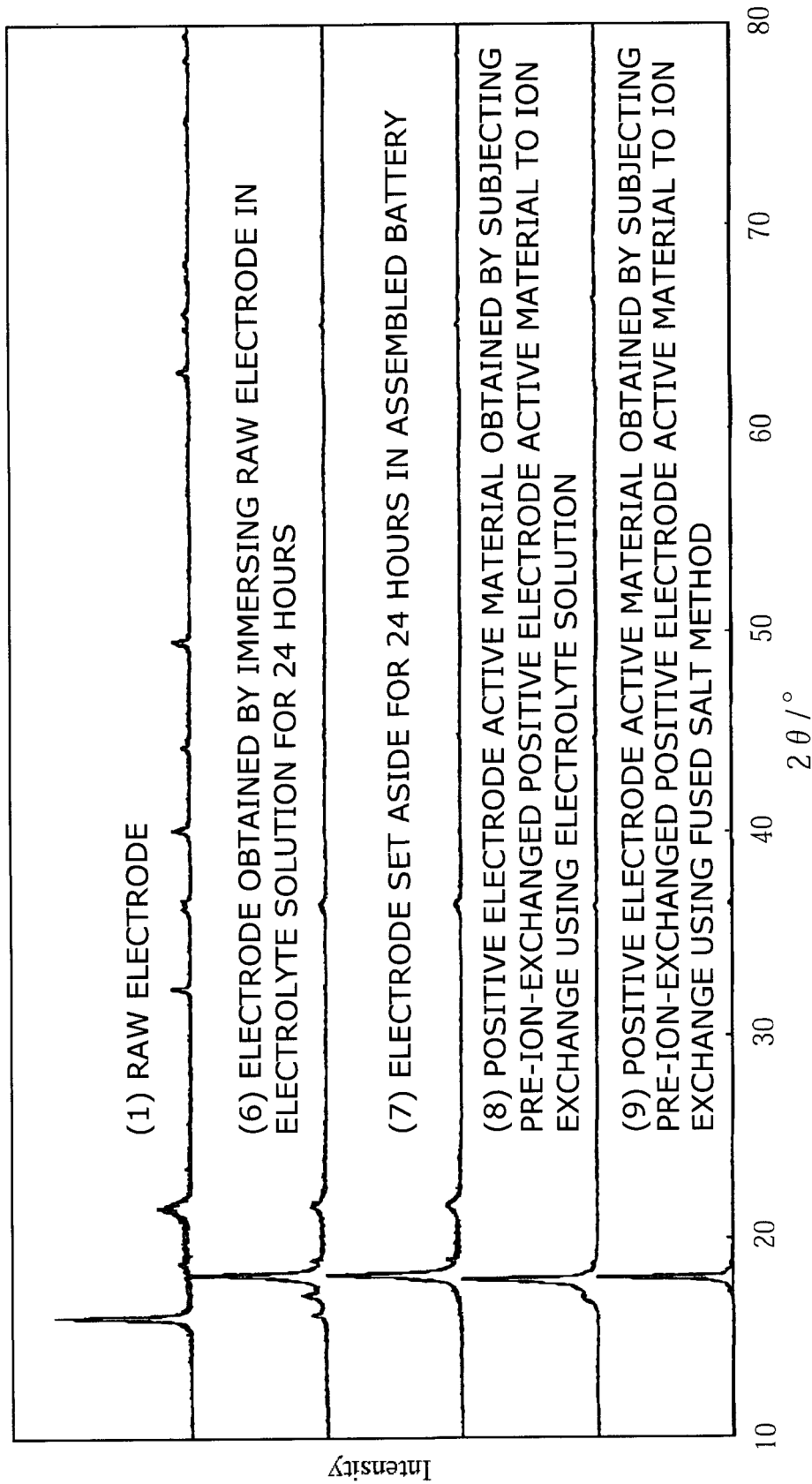
FIG. 3 is a graph showing XRD measurement results for the positive electrode active material used for the present invention cell A7 and a sample obtained by subjecting the positive electrode active material to ion-exchanging.
Figure 4:
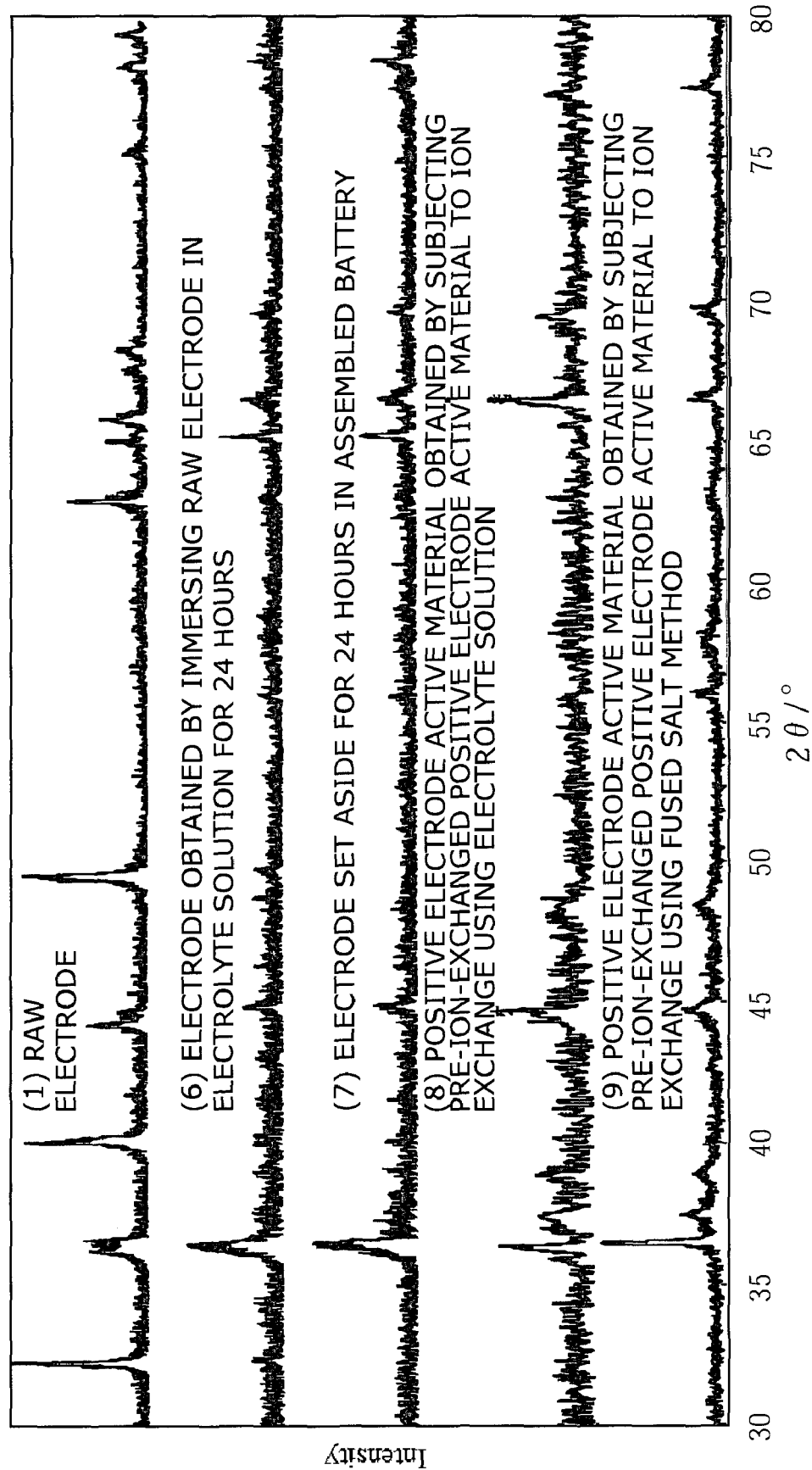
Figure 5:
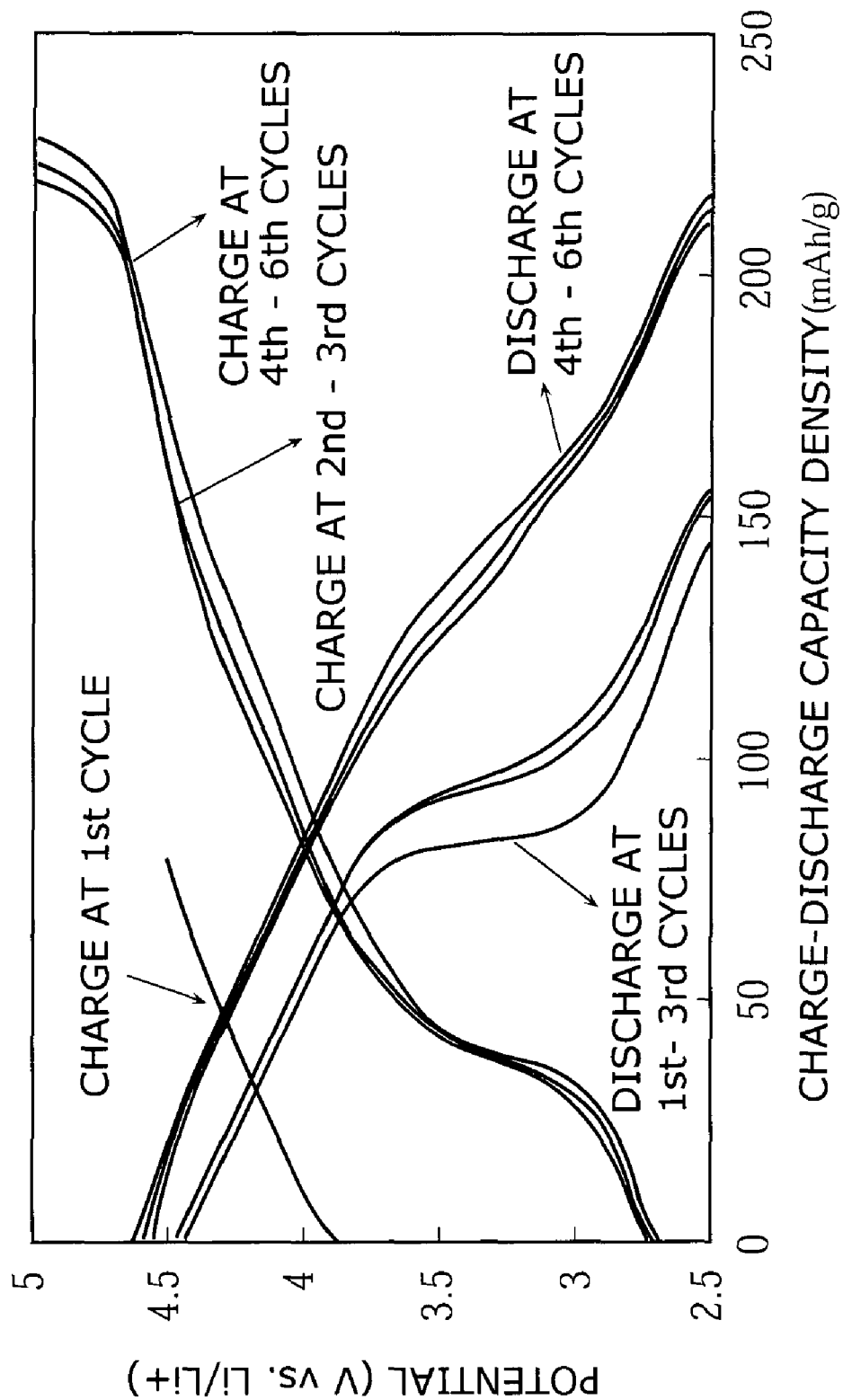
FIG. 5 is a graph showing the charge-discharge characteristics of the present invention cell A7.

1: working electrode
2: counter electrode
3: separator
4: reference electrode
5: test cell
6: lead

The invention claimed is:

1. A method of manufacturing a non-aqueous electrolyte secondary battery, comprising the steps of:
preparing a positive electrode active material comprising a lithium-containing sodium oxide in which the molar amount of lithium is less than the molar amount of sodium by sintering a material containing at least a sodium compound and a lithium compound;

immersing the positive electrode active material in a non-aqueous electrolyte comprising a carbonate-based solvent containing a lithium salt to ion-exchange the sodium oxide;

preparing a positive electrode active material slurry containing the positive electrode active material and a binder, and thereafter applying the positive electrode active material slurry to a positive electrode current collector, to prepare a positive electrode;

interposing a separator between a negative electrode and the positive electrode to prepare a power-generating element; and enclosing the power generating element into a battery case, and filling an electrolyte solution into the battery case.

2. The method of manufacturing a non-aqueous electrolyte secondary battery according to claim 1, wherein the lithium salt is $LiPF_6$, and the carbonate-based solvent is a mixed solvent containing ethylene carbonate and diethyl carbonate.

3. A method of manufacturing a non-aqueous electrolyte secondary battery, comprising the steps of:

preparing a positive electrode active material comprising a lithium-containing sodium oxide in which the molar amount of lithium is less than the molar amount of sodium by sintering a material containing at least a sodium compound and a lithium compound;

preparing a positive electrode active material slurry containing the positive electrode active material and a binder, and thereafter applying the positive electrode active material slurry to a positive electrode current collector, to prepare a positive electrode;

immersing the positive electrode in a non-aqueous electrolyte comprising a carbonate-based solvent containing a lithium salt to ion-exchange the sodium oxide;

interposing a separator between a negative electrode and the positive electrode to prepare a power-generating element; and enclosing the power generating element into a battery case, and filling an electrolyte solution into the battery case.

4. The method of manufacturing a non-aqueous electrolyte secondary battery according to claim 3, wherein the lithium salt is $LiPF_6$, and the carbonate-based solvent is a mixed solvent containing ethylene carbonate and diethyl carbonate.

5. A method of manufacturing a non-aqueous electrolyte secondary battery, comprising the steps of:

preparing a positive electrode active material comprising a lithium-containing sodium oxide having a main peak at $2\theta=15.9°$ to $16.9°$ as determined by X-ray powder crystal diffraction ($CuK\alpha$) and in which the molar amount of lithium is less than the molar amount of sodium, by sintering a material containing at least a sodium compound and a lithium compound;

preparing a positive electrode active material slurry containing the positive electrode active material and a binder, and thereafter applying the positive electrode active material slurry to a positive electrode current collector, to prepare a positive electrode;

interposing a separator between a negative electrode and the positive electrode to prepare a power-generating element; and enclosing the power generating element into a battery case, and filling a non-aqueous electrolyte comprising a carbonate-based solvent containing a lithium salt into the battery case to ion-exchange the sodium oxide.

\* \* \* \* \*